Oct. 13, 1925.

C. SPRECKELS ET AL 1,556,969

TIRE MAKING MACHINE

Filed Nov. 29, 1918 7 Sheets-Sheet 1

Witnesses
H. Gearing
Chas. J. Chinn

Inventors
Howard L. Morris
Claus Spreckels

By Raymond

Their Attorney

Oct. 13, 1925.  
C. SPRECKELS ET AL  
TIRE MAKING MACHINE  
Filed Nov. 29, 1918  7 Sheets-Sheet 4

Witnesses  
H. Gearing  
Chas. J. Chinn

Inventors  
Howard I. Morris,  
Claus Spreckels,  
By Raymond ____  
Their Attorney

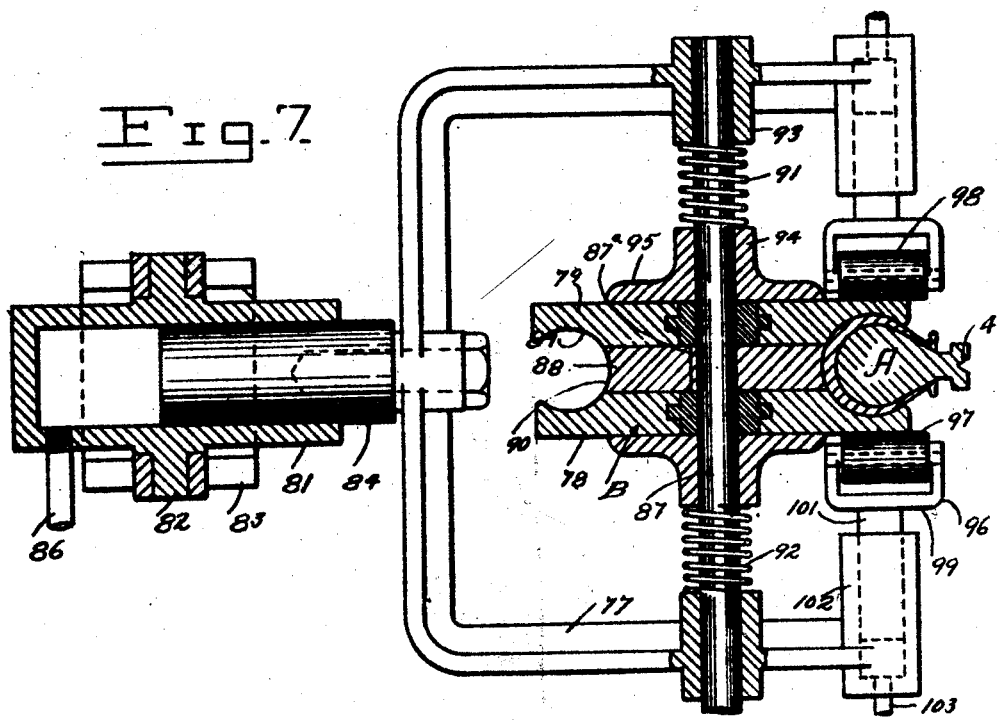

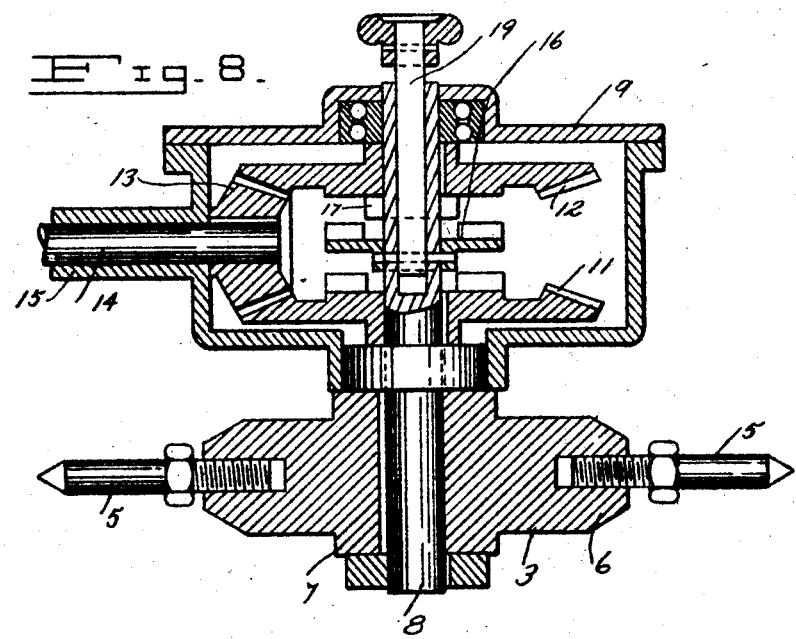
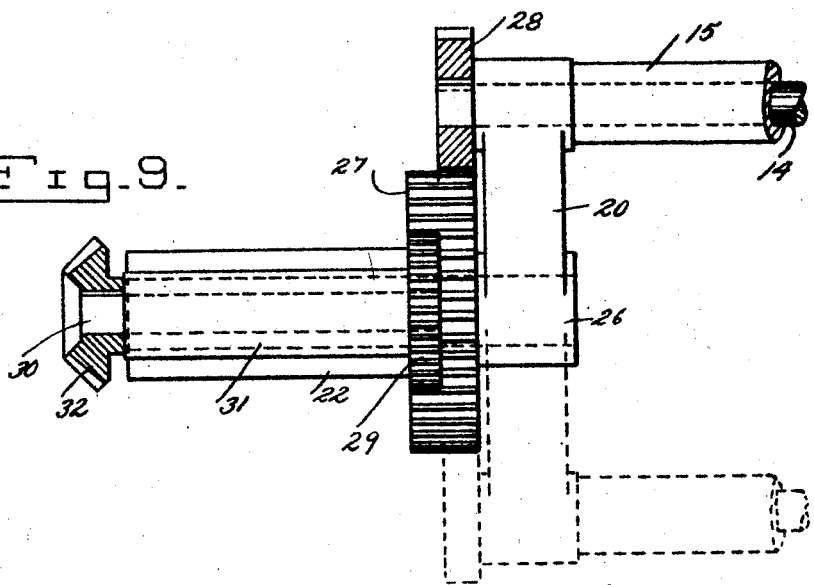

Oct. 13, 1925.

C. SPRECKELS ET AL

TIRE MAKING MACHINE

Filed Nov. 29, 1918  7 Sheets-Sheet 7

Witnesses,
H. Gearing.
Chas. J. Chinn.

Inventors,
Howard I. Morris,
Claus Spreckels;
By
Their Attorney.

Patented Oct. 13, 1925.

1,556,969

UNITED STATES PATENT OFFICE.

CLAUS SPRECKELS, OF SAN DIEGO, AND HOWARD I. MORRIS, OF LOS ANGELES, CALIFORNIA; SAID MORRIS ASSIGNOR TO SAID SPRECKELS.

TIRE-MAKING MACHINE.

Application filed November 29, 1918. Serial No. 264,591.

*To all whom it may concern:*

Be it known that we, CLAUS SPRECKELS and HOWARD I. MORRIS, both citizens of the United States, residing, respectively, at San Diego, in the county of San Diego and State of California, and at Los Angeles, county of Los Angeles, and State of California, have invented new and useful Improvements in Tire-Making Machines, of which the following is a specification.

This invention relates to improvements in machines for making pneumatic tires, particularly the casings or coverings for the inner tubes of pneumatic tires, and resides in the provision of a machine of this character which is of comparatively simple and inexpensive construction and will operate to reduce the number of steps and operations usually required in the manufacture of tires by machinery.

An object of the invention is to provide a machine of the above named character, which will provide for the building up of a tire to the stage which usually to that point requires the use of several different machines, without removing or transferring the tire from said machine to another machine.

In tire manufacturing machines of a type which is well known and in general use, a spinning-down action is required in making the carcass. This action requires the use of rolls which must be rotated and moved while rotated in contact with and over the surface of the carcass, the control of said rolls being manual and requiring the constant attendance and watching of a skilled operator. Machines of this type require a great deal of time for operation and said spinning-down rolls do not provide for a regularity of distribution of pressure and spinning-down action such as required to build up a perfect carcass. Various imperfections in the carcass may easily result from a careless or too rapid operation of machines of this type. Also, in machines of this type the tire material is made up in separate lengths, each length being long enough to be wrapped around the core once. This arrangement causes a series of lapped joints at the ends of the various lengths of tire material and the presence of these lapped joints in a finished tire ofttimes causes a premature breaking down or wearing out of the tire. Other imperfections will result from these lapped joints.

The present invention aims to overcome the objections above named, such as had in the use of the before-mentioned type of tire-forming machines, and to these ends consists in the provision of a tire-forming machine in which the spinning down action requiring the movable rolls is eliminated, together with said rolls, and, a means reliable, effective, simple in construction, and involving a different mode of operation, is provided in substitution therefor, the provision of such means making it possible to manufacture tires in a reliable, accurate, inexpensive and effective manner so that the greatest perfection obtainable in tire manufacturing is had. We also aim to increase the efficiency of tire-making machines by feeding the fabric or tire material of a continuous length. In this way the lap joints provided in the hereinbefore described well-known machines are eliminated; and the advantages derived from the utilization of a continuous length of fabric or tire material are, expeditiousness in manufacturing, the elimination of the particular attention of an operator or attendant, and the absolute prevention of malformation of the carcass, and weak spots therein.

With the above and other objects in view, the invention consists in the novel and useful provision, formation, combination, relative arrangement, and mode of operation of the several parts, members and features, all, as hereinafter described, shown in the drawings, and pointed out in the appended claims.

Figure 10:
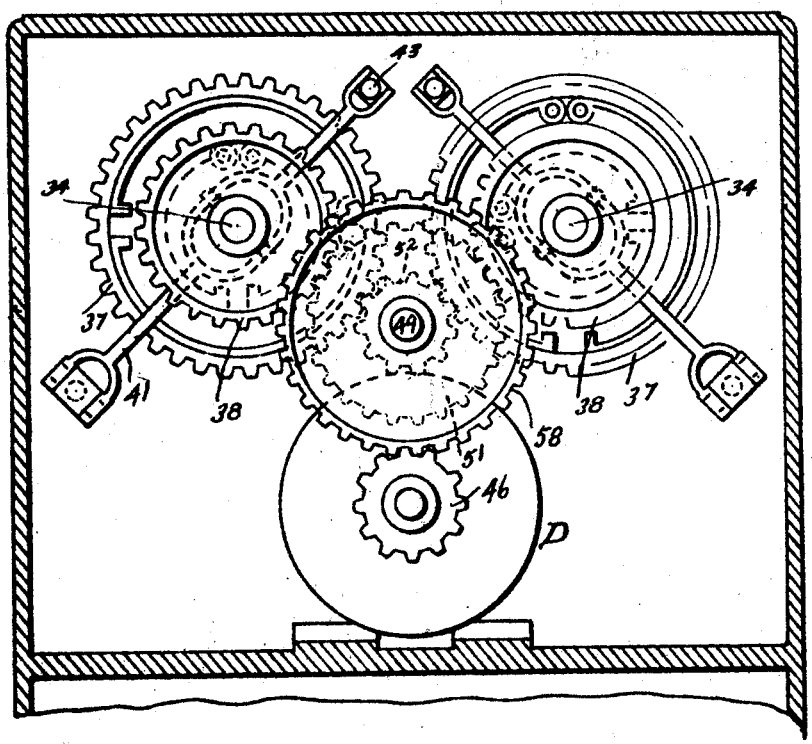
Figure 11:
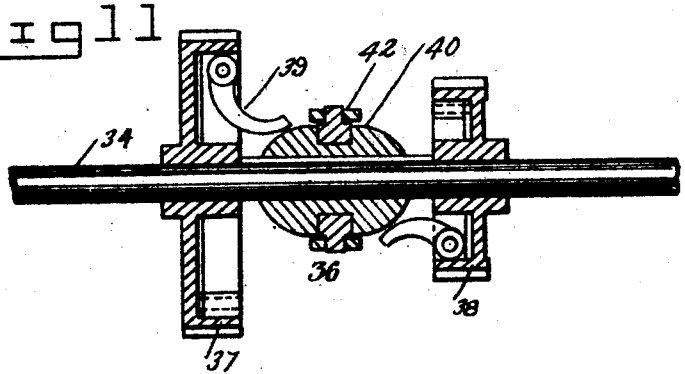

the fabric feed means and a part of the forming mechanism, illustrating its relation to said core;

Figure 5 is a fragmentary sectional view, illustrating in detail the forming rolls for operation upon the sides and bead of a tire;

Figure 6 is a fragmentary top plan view in detail of the forming rolls shown in Figure 5;

Figure 7 is a top plan view partly in section of the main forming means and its associated parts, showing the core with the carcass thereon in section, and operatively associated with the forming means;

Figure 8 is a horizontal sectional view, illustrating in detail the core supporting and holding means;

Figure 9 is a fragmentary top plan view, partly in section, of a portion of the drive means for the core, showing a part of said means in adjusted position in dotted lines;

Figure 10 is a view in elevation of the driving means and associated gearing therefor, particularly showing the clutch means, and the members for operating such clutch means;

Figure 11 is a fragmentary enlarged detail sectional view of one of the clutches.

The invention consists mainly in the provision of a rotating core A upon which the carcass is to be built or made up, an especially constructed forming means B, including rolls forced under pressure into contact with the carcass, a secondary forming means C co-operating with the means B and adapted for forming the carcass adjacent to the sides and beads thereof, and other essential elements for operating the herein mentioned means and devices.

Referring particularly to the drawings throughout the several views, of which like parts are designated by like characters, 1 designates the base structure of a suitable frame 2, upon both of which the various elements and devices of the machine are mounted and supported.

Naming the various devices and elements of the machine in the order of their importance and consideration in use, the core A will come first, and, as shown, is supported to one side of the frame 2 upon adjustable supporting means or a spider 3. The core A upon its inner face is provided with a preferably V-shaped groove 4, into which the ends of adjustable supporting arms 5 engage. These arms 5 are threaded into socket members 6 radiating from a hub 7 that is keyed to a horizontal shaft 8. The shaft 8 is supported in a suitable bearing 9, which is in the form of a housing, having suitable supporting connections with the frame 1. A reversing gear means 10 is mounted within the housing 9 and comprises beveled gears 11 and 12 loose on the shaft 8 and both meshing with a beveled pinion 13.

(See Fig. 8.) The pinion 13 drives the gears 11 and 12 and is keyed to a shaft 14 which extends at right angles to the shaft 8 from one side of the housing 9 within a tubular bearing 15. A clutch member 16 slidably mounted upon the shaft 8 is disposed between the gears 11 and 12 for cooperation with clutch faces 17 and 18 carried by said gears. A means 19 operable exteriorly of the housing 9 is provided to move the clutch member 16 into cooperation with the clutch faces 17 and 18.

The shaft 14, together with the tubular housing or bearing 15 therefor, extends into the frame 2 and cooperates with driving mechanism therein. An arm 20 is secured to the inner end of the bearing 15, extends at right angles thereto, and at its outer end is fixedly mounted upon a stud shaft 21 which is rotatably mounted within a tubular bearing 22 carried by the frame 2. The stud shaft 21 extends beyond the inner end of the bearing 22 and has a nut 23 turned and secured thereon. A part of the periphery of the nut is serrated or notched as at 24 and a spring pressed detent 25 pivoted, as at 26, upon the bearing 22 provides a means for holding or locking the stud 21 against rotation by engaging within the notches or serrations 24. The gear 27 is loosely mounted upon the stud shaft 21 at a point between the arm 20 and adjacent end of the bearing 22. This gear 27 meshes with a gear 28, which is fixed to the inner end of the shaft 14. The gear 27 is driven by a gear 29 that is keyed to a shaft 30. The shaft 30 is rotatably mounted within a bearing 31 carried by the frame 2 and has fixed thereto a beveled pinion 32, which meshes with a corresponding pinion 33 that is fixed to the end of a shaft 34. The shaft 34 is mounted in a series of suitable bearings 35 and extends at right angles to the shaft 30. A friction clutch means 36 is mounted upon the shaft 34 and comprises a large gear 37 and a smaller gear 38, both loosely mounted upon the shaft 34 and carrying pivoted friction dogs 39. Dogs 39 are adapted to be engaged by a friction member 40 that is splined upon the shaft 34 and operated through a pivoted lever 41, which is connected therewith by a yoke 42. An operating rod 43 is pivotally connected with the lever 41 and is disposed at a point accessible to an attendant or operator of the machine.

There is provided a means D for operating the various rotatable elements of the machine, which comprises a motor 44 that is mounted within a suitable supporting plate 45 upon the frame 2. A drive gear 46 is fixed to the drive shaft 47 of the motor 44 and meshes with a gear 48 located above the shaft 47, upon the shaft 49. A pinion or gear 50 which is larger than the gear 46 is keyed to the shaft 49. A pinion 51 is keyed to the shaft 49 and meshes with the gear 37 of the clutch 36. A smaller pinion 52 is fixed to the shaft 49 and drives the larger pinion 38 of the clutch means 36. It will be seen that these gears are constantly in mesh and that in order to vary the speed of rotation of the revolvable parts of the device, the clutch means 36 is actuated. When the member 40 of the clutch means 36 co-operates with the gear 37 so as to rotate the shaft 34, a slow speed is obtained, whereas a high speed of rotation of the parts is obtained when the member 40 is moved into co-operation with the gear 38.

The elements hereinbefore described comprise the means for rotating the core A and for operating the other revolving elements of the machine. The operation of this means in detail will be later described.

There is provided a means E for feeding the tire fabric to the core A which comprises a drum 53 having its trunnions 54 movably and rotatably mounted within notches 55 of the frame 2. A suitable quantity of tire fabric 56 is rolled upon the drum 53 and to prevent the fabric in the roll from sticking together a liner sheet or strip 57 is rolled with the material 56 so as to separate said material. The fabric 56 is passed under a tension roll 58 carried by the frame 2 and extends upwardly and over a roll 59 corresponding to the roll 58 and located above the latter. From the roll 59 the material extends under a larger roll 60 and then over a correspondingly large roll 61, and from thence to the means B for forming the carcass or tire. These rolls 58, 59, 60 and 61 are provided to cause the material or fabric 56 to be unrolled and fed to the means B under tension. The liner strip or sheet 57 is attached to a drum 62 that is vertically adjustably mounted as at 63 upon the frame 2 above the drum 53 and disposed in contact with the periphery of the roll of material 56. It will be seen that upon rotation of the roll 56 to unreel the material the drum 62 will be rotated and the liner 57 wound thereupon.

The means B for forming the carcass acts to work the fabric 56 on the core, as will be later more fully described. This means comprises a slidably or movably mounted carriage 64 which is slidably mounted as at 65 upon the base 1. There is provided a means F for shifting or sliding this carriage 64 upon the base 1. This means F may be manually or otherwise operated as desired, but preferably comprises a fluid-operated piston 66 which is operatively mounted within the cylinder 67, and fixed to a piston rod 68. The rod 68 is secured to a lug 69 which depends from the carriage 64. An operating fluid is admitted to the cylinder 67 through a feed pipe 70. The feed pipe 70 is branched, providing pipes 71 and 72 which communicate with the cylinder 67 at points adjacent to the ends thereof. A valve 73 constructed so as to control the passage of fluid in said pipes to permit the entrance of the fluid to either end of the cylinder, is mounted within the pipe 70 at the junctures of the branches thereof with said pipe and is controlled by a rocking member 74 having pedals 75 and 76 at its ends.

Mounted within a skeleton frame or yoke 77 are forming rolls or discs 78, 79 and 88 that are adapted to cooperate with the core A so as to form the carcass upon said core. The frame 77 is supported in position, and the forming roll 78 and 79 upon the frame are forced under pressure into contact with the carcass on the core A, by a fluid-operated supporting means generally designated 80. To support this means 80 in the desired position a link 80' is employed, said link being connected to the adjacent structure 80'' of the frame 2 and to the frame 77. The means 80 comprises a cylinder 81 which is pivoted as at 82 within bearings 83 mounted on the carriage 64. A piston 84 is operatively mounted within the cylinder 81 and said piston is fixed by a suitable fastening element 85 to the frame or yoke 77. The working or operating fluid for the means 80 is admitted to the lower end of the cylinder 81 by a pipe 86 in communication with said lower end of the cylinder and any suitable means, not shown, may be provided to control the fluid passage to the cylinder and the operation of said means 80.

A shaft 87 is journaled in the side arms of the frame 77, and extends across said frame and rotatably supports the rolls 78 and 79. The rolls are loosely mounted upon the shaft and a disc or forming roll 88 of the same suitable yielding material as the rolls are composed of such as rubber is interposed between said rolls in engagement therewith. The opposed faces of the rolls adjacent to the peripheries thereof are cut away to provide carcass-engaging and forming faces 89 and the periphery of the disc 88 is concaved as at 90 so that the curve of said concavity is concentric with the curve of the faces 89. The rolls 78 and 79 together with the disc 88 provide the main tire-forming element B and the curved portions 89 and 90 form a concavity in the element B which is adapted to conform to the curvature of the core A and engage and work the carcass into formation. The forming rolls 78 and 79 are forced into intimate engagement with the carcass by expansion springs 91 and 92 which are mounted upon the shaft 87. At their outer ends these springs abut bearings 93 which are provided for the shaft 87 and upon their inner ends these springs abut bosses 94 formed on the outer faces of annular plates 95. The plates 95 are mounted upon the shaft 87 and engage the outer faces of the rolls 78 and 79. It will thus be seen that the rolls 78 and 79 are at all times forced towards one another so that the desired working action upon the carcass is provided. The resilient or yielding disc 88 disposed between the rolls 78 and 79 together with the resilient or yielding rolls 78 and 79 provides for the conformity of the carcass-forming faces 89 and 90 to the carcass, and insures the proper working of said carcass during the entire forming operation. The radial pressure of the forming rolls upon the carcass that is provided by the means 80 in combination with the side pressure of the rolls furnished by the springs 91 and 92 provides for a thorough, exact and uniform carcass working and forming action which results in the provision of a perfectly, accurately and expeditiously formed carcass. The disc 88 is keyed to the shaft 87 to rotate the shaft, as at 87ª.

There is provided means designated 96 as an entirety for forcing said rolls 78 and 79 by fluid pressure to intimately engage the sides of the carcass so as to insure a proper carcass working and forming action. This means comprises pressure rolls 97 and 98 mounted on opposite sides of the element B in contact with the rolls 78 and 79 respectively. Each of these rolls is identical as to construction and is rotatably supported in a yoke 99 formed on the outer end of a piston 101. The piston 101 is operatively mounted within the cylinder 102 which is carried by the frame 77. A fluid feed pipe 103 is connected with the cylinder 102 and provides for the introduction of a working fluid into the cylinder so as to force said piston 101 outwardly and cause the roller to bear against the outer face of its respective forming roll.

There is provided the means C for rolling or working in the sides of the carcass and for more sharply defining the beads thereof. This means comprises two devices operating on both sides of the core A. The frame 77 is provided with upward extensions 104 located on opposite sides of the means B. These extensions 104 support the two devices comprising the means C and each of these devices comprises a cylinder 105 pivoted as at 106 to the extension 104. The piston 107 is operatively mounted within the cylinder 105 and upon its outer end is provided with a fork or yoke 108. The rocking roll supporting member 109 is pivoted as at 110 intermediately of its ends and between the arms of the fork 108. This supporting member 109 at one end rotatably supports a forming roll 111 which is adapted to engage the side of the carcass adjacent to the bead and provides a rolling in action so as to thoroughly smooth out and work the carcass upon the sides thereof. This roll is disposed at an angle of approximately 45 degrees to the longitudinal axis of the piston 107, and is also slightly angled to the path of rotation of the carcass, to cause a side slippage between the fabric and such roll 111 which exerts a constant stretching pull upon the fabric toward the bead. The member 109 is twisted or transversely formed so as to provide for this disposition of the roll 111. Upon its other end the member 109 rotatably supports a bead defining or working roll 112 that is provided with a comparatively sharp edge 113 which works the carcass around the bead and sharply defines the contour of the carcass adjacent thereto. This roll 113 is disposed approximately at right angles to the roll 111 so as to properly work the fabric or the carcass adjacent to the bead. The actuation of the piston 107 is caused by fluid which is admitted to the cylinder 105 by a pipe 114. When the piston is forced outwardly the rolls 111 and 107 is forced outwardly the rolls 111 and 112 are forced into close engagement with the carcass and in being mounted upon a common support which is pivoted intermediately of its ends will readily conform to the irregularities of the carcass and be acted upon with equal force. Any suitable means not shown may be provided to control the admission of operative fluid to the cylinder 105.

The frame 2 is provided with an extension 115 upon its upper side and a reel or drum 116 is rotatably mounted upon said extension. This reel or drum is disposed so as to align with the core A and provides a means for retaining the vulcanizible material or tread to be applied to the carcass and for feeding said material to the core.

In order to provide for the unreeling or feeding of the sheet or strip of fabric 56, under tension at a point prior to its contact with the core and for the purpose of causing a prestretching of said fabric so as to cause a pre-forming stretching action thereof there are provided sprocket wheels 117 and 118, the one 117 being secured to the shaft 87 and the one 118 being secured to the roll 61. A chain 119 is rove around said sprockets and said chain and sprockets control the speed of rotation of said roll 61 causing said roll 61 to rotate at a slower rate of speed than the rate of speed of rotation of the periphery of said roll 88. This action it will be seen causes the strip or sheet of material 56 to be unreeled under tension and stretched as hereinbefore described.

The operation, method of use and advantages of the invention will be readily understood from the foregoing disclosure taken in connection with the accompanying drawings and the following description of the operation of the machine.

The core A having been properly centered relatively to the adjustable spider 3 through the manipulation of the arms 5 in their sockets 6; and the roll of tire fabric 56 having been wound around the several tension rolls 58, 59, 60 and 61, and extended over the member B into contact with the core A, the machine is ready for operation. The end of the tire fabric 56 is placed between the core and peripheries of the rolls 78, 79 and 88 and will adhere to the surface of the core. In this connection it is to be noted that the sheet of material 56 has a bias weave and when the end of the strip is adhered to the core said strip or sheet is folded along its longitudinal median line so that portions of the sheet lie on the sides of or conformed to the curvature of the core. The strip or sheet of material is under tension and this pull or tension upon the sheet causes it to fold or partially assume a cup or trough-like formation from a point over the roll 61 to the core A.

The motor 44 is operated from a suitable source of power not shown, and rotates the gear 46 which in turn rotates the gear 48 on the shaft 49. The shaft 49 carries the gears 51 and 52 which respectively mesh with the small and large gears 38 and 37 the shaft 34. The beveled pinion 33 is fixed to the shaft 34 and meshes with the pinion 32 on the shaft 30, the rotation of which shaft 30 imparts rotation to the shaft 14 thru the gears 27 and 28. The shaft 14 through the reverse gearing 16, rotates the spider or core support 3, and causes the core A to rotate as desired. The speed of rotation of the core may be regulated to suit the particular operation of the machine and the conditions concurrent with such operation by the proper manipulation of the rod 43 which operates the clutch 36 through the medium of the lever 41. The sliding clutch member 40 of the clutch 36 may be moved either into engagement with the friction dogs 39 of the gear 38 or the dogs 39 of the gear 37, and depending upon the position of this member 40 the gear ratio and subsequent speed of rotation of the core is determined. When the clutch member 40 is engaged with the dogs 39 of the gear 38 rotation is transmitted to the shaft 34 through the gear 46 to the larger gear 50, the shaft 49, and gear 51, which mesh with the gear 38. It will thus be seen that since the gears 51 and 38 are approximately the same size and the gear 50 is larger than either of the gears 51 or 38 that the speed of rotation of the shaft 34 and consequently the core A will be greater when the member 40 is in cooperation with the gear 38. Inasmuch as said member 40 is in cooperation with the gear 37 said gear is driven by the small pinion 52 and a low gear ratio is thus provided.

By manipulating the operating means 19 in the proper manner the clutch member 16 may be moved into cooperation with the desired gear so as to provide for rotation of the core A in one direction or the other. It will be seen that with this mechanism the direction of rotation of the core may be reversed at any desired time during the tire-forming operation of the machine.

Figure 1:
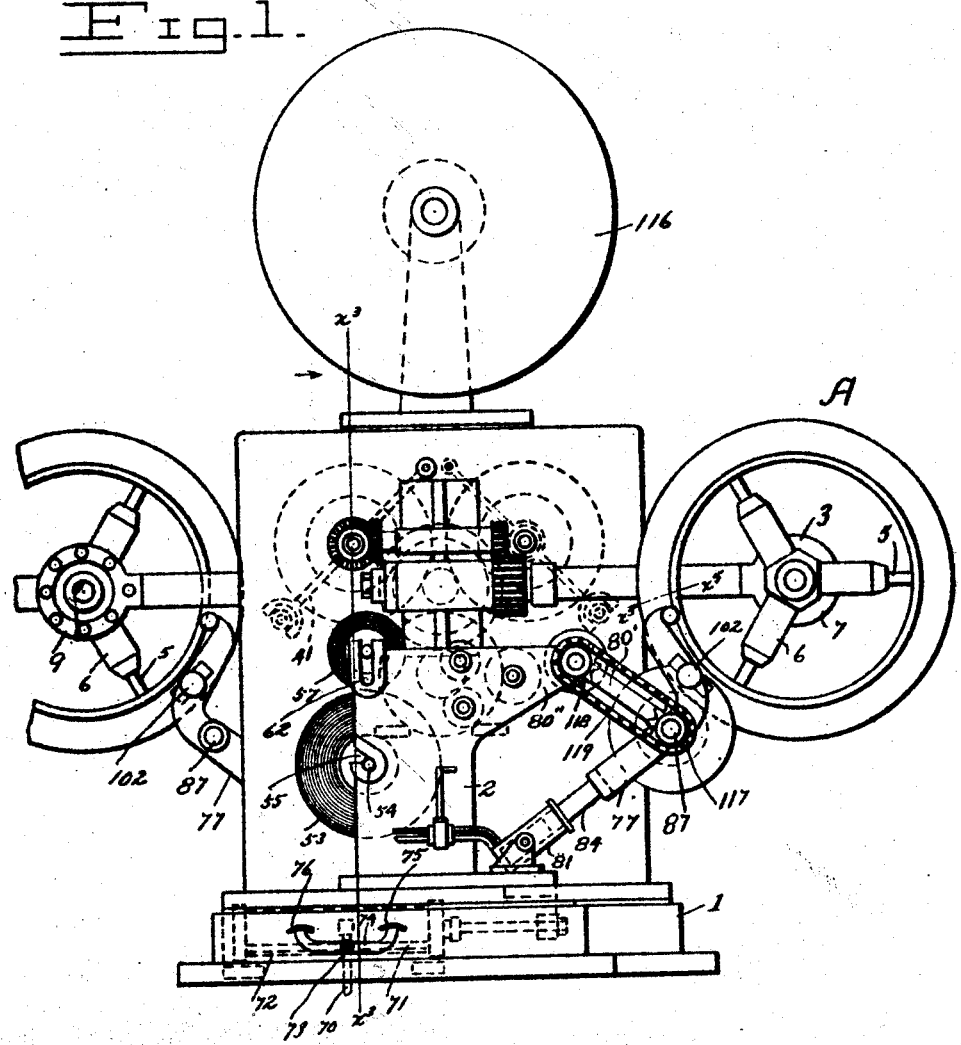
Figure 1 represents a front elevation of a tire-forming machine constructed in accordance with the present invention, said machine as shown embodying two identical constructions, or, in other words, being a double machine.
Figure 2:
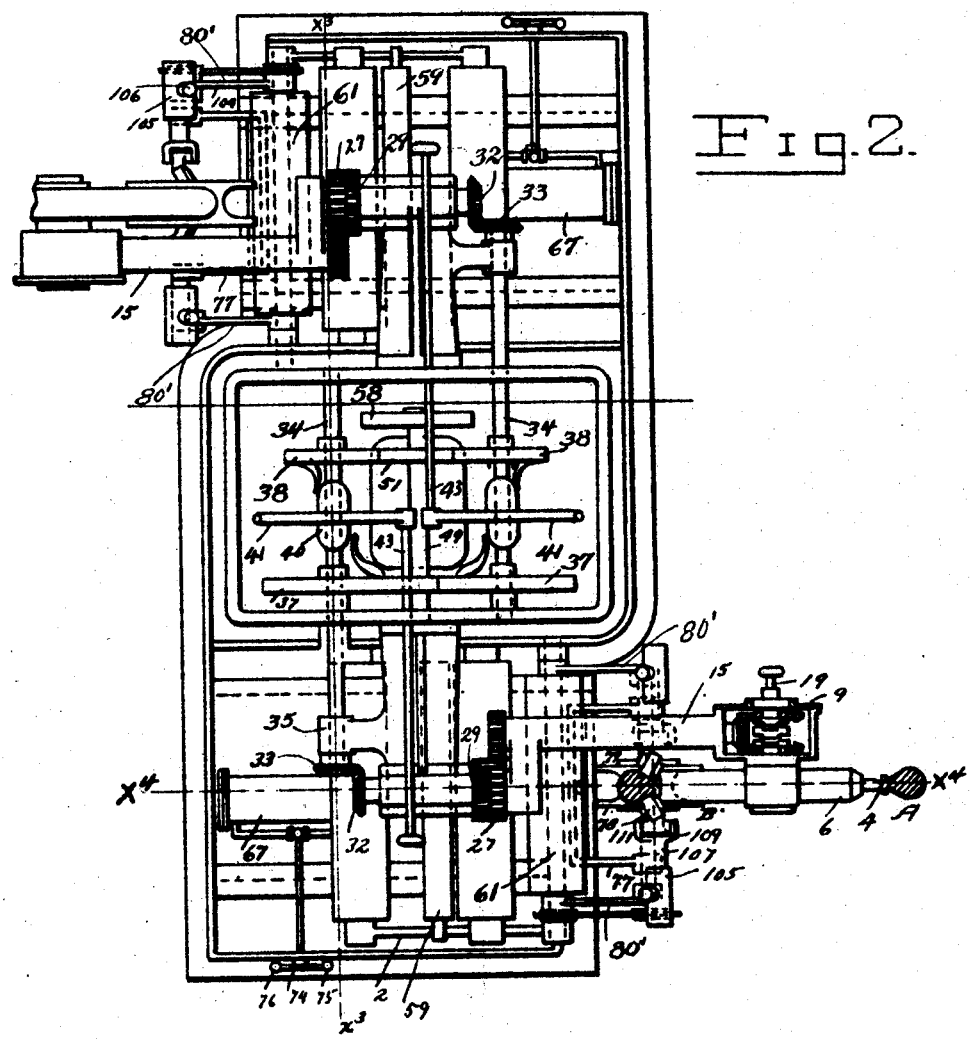
Figure 2 is a top plan view of the machine.
Figure 3:
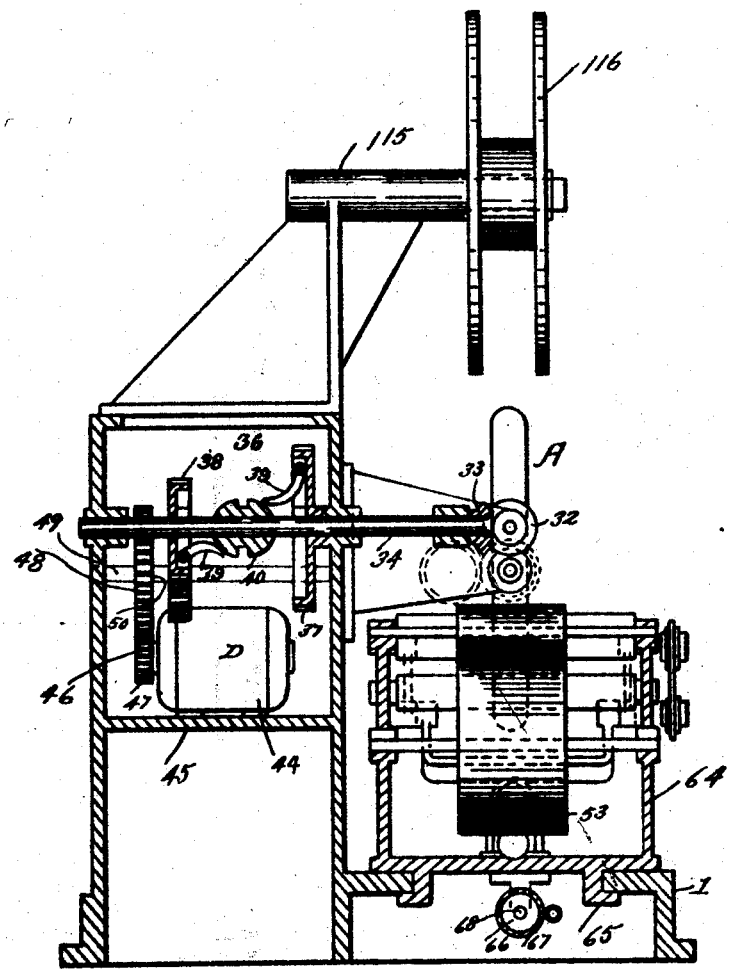
Figure 3 is a vertical sectional view taken on line $x^3$—$x^3$ of Figure 1.
Figure 4:
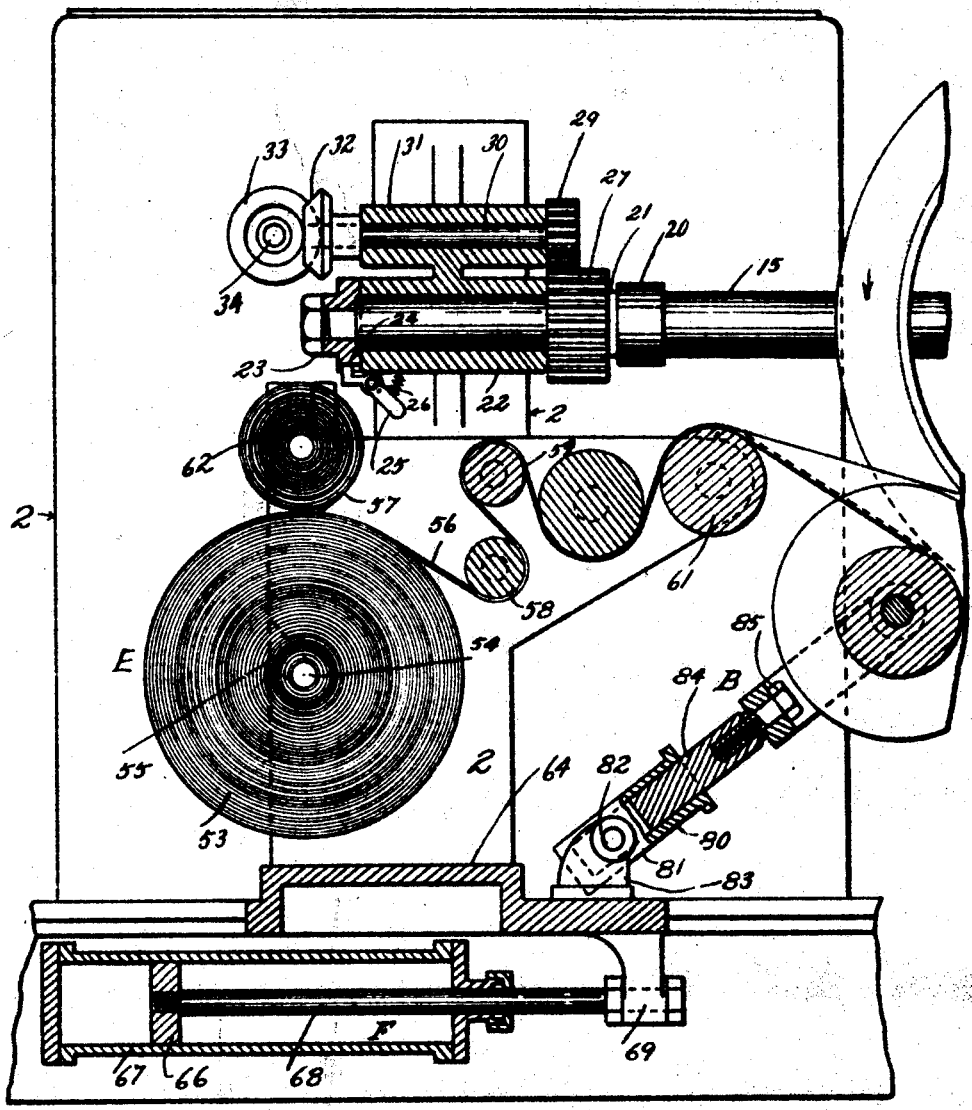
Figure 4 is an enlarged detail fragmentary sectional view of a part of the machine showing the means for rotating the core.

As the core A rotates in the direction of the arrow shown in Figure 4 of the drawings, which direction is counter-clockwise, the sheet or strip of the fabric 56 is wound upon said core. The liner strip 57 which prevents the fabric in the roll from sticking together, at the setting of the machine for operation is attached to the drum 62 and will be wound upon said drum during the unreeling action of the fabric. This winding up of the strip 57 is caused by the contact of the roll 62 with the periphery of the roll of fabric.

At the time of the adhering of the fabric to the core A during the commencement of the tire-making operation, the carriage 64 has been moved into operative position so as to dispose forming means B into operative relation with the core. This extension of the carriage 64 is caused by the means F, the control of which is provided by rocker member 74 carrying the pedals 75 and 76. By pressing the pedal 76 the working fluid is admitted to the left end of the cylinder 67 and forces the piston 66 and rod 68 to the right. This movement of the rod causes the carriage 64 to be extended into operative position, said carriage sliding upon the base 1. The carriage 64 is extended or moved forwardly until the forming rolls 78 and 79 of the means B come into contact with the fabric being applied and wound upon the core A and the carriage is thus yieldingly held extended or moved forward under the pressure of the working fluid in the cylinder 67 to such an extent that the rolls 78 and 79 and 88 forcibly and yieldably bear upon the fabric and produce a working down smoothing action thereupon, causing said fabric to be thoroughly stretched and to conform to the contour of the core A. The pressing or smoothing out action of the rolling down members or forming rolls 78 and 79 is accentuated by the means 80. The working fluid from the pipe 86 is admitted to the cylinder 81 of said means 80, and the piston 84 which is directly connected with the frame 77 supporting the rolls 78 and 79 and 88 is moved outwardly. The radial yieldable pressure provided in this manner insures the forcible working of the forming rolls upon the carcass. This pressure will be maintained as long as the working fluid is operating within the cylinder 81 and may be varied or regulated to suit the conditions of operation of the machine. The link or connection 80' provides for the proper disposition of the means B relatively to the core at all times.

The springs 92 in forcing the forming rolls yieldable 78 and 79 towards one another cause the carcass-forming faces 89 of said rolls to press forcibly upon the fabric of the carcass being built up on the core. The yieldable disc 88 between the rolls permits of this pressing action produced by the springs 91 and 92 and as said disc has a concaved periphery which will conform to the curvature of the carcass, said disc will aid the rolls in the working down or forming action. The means 96 aids the springs 91 and 92 in their pressing action upon the forming rolls and may be operated by allowing the working fluid to enter the cylinders 102. When this is done the pistons 101 are extended and press the rolls 97 and 98 into forcible engagement with the outer faces of said rolls adjacent to the peripheries thereof. In this connection it will be noted that these rolls 78 and 79 extend past points which are approximately midway of the sides of the core or carcass thereon, said rolls terminating at points but slightly distant from the beads or edges of the carcass. The degree of pressure of said rolls 97 and 98 may be varied as desired by the pressure of the working fluid which is admitted to the cylinders 102 and the control of said working fluid may be had in any suitable manner not shown.

In order to provide for the working down or rolling down action of the carcass from the point where the action of the means B including the rolls 78 and 79 and the disc 88 terminates, the means C is provided. To operate the means C the working fluid is admitted from the pipes 114 to the cylinders 105 causing the piston 107 to be extended towards the carcass and the rolls 111 and 112 which are connected with said piston to be pressed, are forced into engagement with the sides of the carcass. The roll 111 rolls down or works the carcass at the points of the sides thereof where the working effect of the means B terminates and roll 112 works around the top of the bead as shown in Figure 5 of the drawings so as to more clearly define said bead on the carcass. It will be noted that the rolls 111 and 112 are carried upon the ends of the rocking member 109 which is pivoted at 110 to the piston 107. This construction provides for an equalizing action relative to the rolls and insures a thorough working of the carcass.

The fabric is wound as hereinbefore described, upon the core A, each winding being carefully worked down and conformed to the shape of the core. The pre-stretching and pre-forming action provided as hereinbefore described, facilitates an expeditious working down action, and the various working down and forming members, namely, the rolls 78, 88, 79, 97, 98, 111 and 112 may be forced as desired into operative contact with the carcass through the medium of the pneumatic or fluid operated forcing means provided therefor. In this connection it will be noted that the fluid operated means may be controlled from a single controlling element or master control, not shown, if desired, so as to eliminate stops in the operation of the machine as an entirety. After the completion of the carcass the pedal 75 is depressed and the fluid will be caused to enter the other end of the cylinder 67 and retract the piston and rod so as to withdraw the carriage 64 and forming means B and C carried thereby. The operation of the machine is otherwise stopped, and if any other steps in the making of the tire are necessary prior to the treading thereof, or if it is desirous to dispose of the tire in a different position the spring-pressed detent 25 is released so that the stub shaft 21 carrying the right angularly extending arm 20 may be turned. Since the arm 20 is connected with the tubular bearing 15 for the shaft 14 the core carrying the carcass may be turned from vertical to horizontal position or to any other positions between vertical and horizontal and retained in such position by allowing the detent 25 to engage the serrations 24 and again lock the shaft 21 and parts attached thereto against rotation.

Without moving the carcass from the core A the treading action may be carried out. In this event the tread material, not shown, is carried upon the reel 116, and since said reel aligns with the core when the latter is in vertical position the said treading action will be greatly facilitated.

With reference to the foregoing description and the accompanying drawings, it will be seen that there is provided a machine for forming or making pneumatic tires in which the forming and making action embodies an entirely new mode of operation as compared to the known modes of operation in the art of building or making tires. One of the essential advantages of the invention is that the spinning down action such as employed in the present-day machines and which requires the unerring skill of an operator, the employment of comparatively complicated associated elements of construction and which ofttimes proves inaccurate and undesirable and faulty, is eliminated, and a positive simply constructed and reliable working-down or forming means substituted therefor.

Another essential feature of the invention is that the fabric prior to its application to the core is pre-stretched and preformed, resulting in an accurate and expeditious application thereof to the core, or a reliable, accurate and expeditious working-down action.

A further essential feature of the invention is to provide a continuous length of tire fabric or material so that lapped joints such as are usually formed in the building of a carcass with machines heretofore, are eliminated, and time and labor are saved in the manufacturing of a tire, and all possibility of malformation and resultant premature wearing out or breaking down of the tire are prevented.

Having thus disclosed our invention, we claim and desire to secure by Letters Patent:

1. In a tire making machine, the combination with a revoluble core, of means for feeding tire material to the core, tread forming means, a frame supporting the tread forming means in operative relation to the core, rocking members carried by the frame at the sides of the core, and bead and tire forming rolls carried by the said rocking members in a balanced relation to each other.

2. In a machine of the character described, the combination with a core, of means for revolving the core, means for feeding tire material to the core, a frame movable toward and away from the core, shaping means carried by the frame for engaging one zone of the tire material on the core, a rocking member carried by the frame, and additional shaping means carried by the rocking member in a balanced relation to each other and engaging another zone of the tire material.

3. In a tire making machine, the combination with a revoluble core, of means for feeding tire material to the core, a frame movable toward and away from the core, and a side forming roll and a bead forming roll carried by the frame and rockably mounted in a balanced relation to each other.

4. In a tire making machine, the combination with a revoluble core, of means for feeding tire material to the core, a frame, a rocking member pivoted intermediate of its ends upon the frame, a forming roll carried by one end of the rocking member, and a bead forming roll carried by the opposite end of the rocking member in a balanced relation to the forming roll.

5. In a tire making machine, the combination with a revoluble core, of means for feeding tire material to the core, a frame, a rocking member pivoted intermediate of its ends upon the frame, a forming roll carried by one end of the rocking member, and a bead forming roll arranged at substantially right angles to the forming roll and carried by the opposite end of the rocking member in a balanced relation to the forming roll.

6. In a tire making machine, the combination with a revoluble core, of means for feeding tire material to the core, a frame, a rocking member pivoted intermediate of its ends upon the frame, a forming roll carried by one end of the rocking member, and a bead forming roll carried by the opposite end of the rocking member in a balanced relation to the forming roll, the said rolls being set at an angle to the path of rotation to the core to produce side slippage between the tire material and the rolls.

7. In a machine of the character disclosed, a core upon which a tire may be built, means to apply tire material to the core, means to rotate the core, and means for engaging and forming material applied to the core comprising independent outer and intermediate yieldable forming rolls mounted to turn on the same axis, and means for supporting the forming rolls, all of said rolls having faces for engagement with the material applied to the core.

8. In a machine of the character disclosed, a core upon which a tire may be built, means to apply tire material to the core, means to rotate the core, and means for engaging and forming material applied to the core, comprising independent outer and intermediate yieldable forming rolls, means for supporting the forming rolls, all of said rolls having faces for engagement with the material applied to the core, and means to yieldingly force the tire-forming rolls together.

9. In a machine of the character disclosed, a core upon which a tire may be built, means to apply tire material to the core, means to rotate the core, and means for engaging and forming material applied to the core, comprising independent outer and intermediate forming rolls, means for supporting the forming rolls all of said rolls having faces for engagement with the material applied to the core, means to yieldingly force the tire-forming rolls together, and means for yieldingly forcing the rolls towards the core.

10. In a machine of the character disclosed, a core upon which a tire may be built, means for applying and forming tire fabric upon the core comprising independent outer and intermediate forming rolls disposed for engagement with the fabric applied to the core, a shaft for supporting said rolls, means for forcing said rolls towards each other, and means for moving said rolls towards and away from the core acting to hold said rolls in yieldable engagement with the fabric upon the core during the operation of the machine.

11. In a machine of the character disclosed, a core upon which a tire may be built, means to apply tire material to the core, means to rotate the core, resilient forming rolls adapted for engagement with that portion of the material upon the core over which the tread is to be disposed, a frame for supporting said rolls, pressure rolls disposed on opposite sides of the core and engaging the outer faces of certain of the first named rolls to force said rolls into operative contact with the material upon the core, and yielding means normally urging the frame to force said pressure rolls into operative position.

12. In a machine of the character disclosed, a core, means to rotate the core, means to apply tire material to the core, a shaft, a frame supporting the shaft, resilient tire-forming rolls mounted upon the shaft, all of said rolls having arcuate carcass-forming faces for engagement with the material applied to the core, and means mounted upon the shaft and tending to force said forming rolls together; one of said rolls being fast upon said shaft.

13. In a machine of the character disclosed, a core upon which a tire may be built, means to rotate the core, means to apply tire material to the core, a frame, means carried by the frame to engage and form that portion of the material upon the core over which the tread is to be disposed, rocking members pivoted intermediate of their ends with the frame, and forming rolls mounted upon certain ends of the rocking members and disposed for engagement with those portions of the material upon the core, not engaged by the first named forming means, and bead forming rolls mounted upon the other ends of the rocking members.

14. In a machine of the character disclosed, a core upon which a tire may be built, means to rotate the core, means to apply tire material to the core, a frame, means carried by the frame to engage and form that portion of the material upon the core over which the tread is to be disposed, rocking members pivoted intermediate of their ends with the frame, and forming rolls mounted upon certain ends of the rocking members and disposed for engagement with those portions of the material upon the core not engaged by the first named forming means, bead forming rolls mounted upon the other ends of the rocking members, pistons with which said rocking members are pivotally connected, cylinders receiving said pistons, and means for supplying an elastic fluid to the cylinders to move said pistons outwardly and yieldingly force the rolls into operative contact with the material upon the core.

15. In a machine of the character disclosed, a core upon which a tire may be built, means to apply tire material to the core, means to rotate the core, a main frame structure for said machine, a carriage slidably mounted upon the frame structure, means for moving said carriage towards and away from the core, a cylinder pivoted upon said carriage, a piston slidable within the cylinder, means to supply operating fluid to the cylinder to force the piston outwardly towards the core, means to engage and form the material applied to the core, a frame for said means connected with said piston and a link pivotally connected with the main frame structure and said last named frame to support the frame and forming means thereon in a proper position for operation.

16. A tire-forming machine comprising a frame, a core rotatably mounted upon the frame, means to rotate the core, means to apply tire fabric to the core, forming rolls for engaging that portion of the material upon the core over which the tread is to be disposed, a frame supporting said forming rolls, means to yieldingly force said frame and forming rolls into engagement with the material upon the tire, means for supporting and moving said last named means towards and away from the core, other tire-forming rolls rockingly connected with the last named frame and disposed for engagement with that portion of the material not engaged by the first named rolls, and means for yieldingly forcing the last named rolls into engagement with the material on the core.

17. A tire-forming machine comprising a frame, a core rotatably mounted upon the frame, means to rotate the core, means to apply tire fabric to the core, forming rolls for engaging that portion of the material upon the core over which the tread is to be disposed, a frame supporting said forming rolls, means to yieldingly force said frame and forming rolls into engagement with the material upon the tire, means for supporting and moving said last named means towards and away from the core, other tire-forming rolls rockingly connected with the last named frame and disposed for engagement with that portion of the material not engaged by the first named rolls, means for yieldingly forcing the last named rolls into engagement with the material on the core, and bead-forming rolls rockingly connected with the last named frame and a rocking member common to said last named rolls and the second named rolls.

18. In a machine of the character disclosed, a core upon which a tire may be built, and means for engaging and forming tire material to be applied to the core; said means comprising three independent disc members, a shaft supporting said disc members, one of said disc members being keyed to said shaft, and means for rotating said shaft.

19. In a machine of the character disclosed, a core upon which a tire may be built, and means for engaging and forming tire material to be applied to the core; said means comprising three independent disc members, a shaft supporting said disc members, one of said disc members being keyed to said shaft, and means for rotating said shaft; said disc members being recessed to form a concavity for reception of the core member.

20. In a tire-making machine, the combination with a revoluble core, of means for feeding tire material to the core, a frame movable toward and away from the core, and a tire-forming roll and a bead-forming roll carried by the frame and rockingly mounted in a balanced relation to each other; one of said rolls being mounted in an angled position to the path of rotation of the core, and the other of said rolls being disposed at approximately right angles to the first roll.

21. In a tire-making machine, the combination with a revoluble core, of means for feeding tire material to the core, a frame movable toward and away from the core, and a tire-forming roll and a bead-forming roll carried by the frame and rockingly mounted in a balanced relation to each other; one of said rolls being mounted in an angled position to the path of rotation of the core, and the other of said rolls being disposed at approximately right angles to the first roll, said last named roll being provided with a sharp edge portion for engagement with the tire material to sharply define the same around the bead.

22. In a machine of the character disclosed, a core upon which a tire may be built, means to supply tire fabric to the core, means to rotate the core, means for forming the fabric on the core, and other forming means disposed for engagement with the fabric adjacent to the edges thereof; said last named forming means comprising rolls set each at an angle to the path of rotation of the core to produce side slippage as between the fabric and such latter forming rolls and consequent stretch of the fabric toward the extreme edges thereof, and a rocking member carrying the last mentioned rolls.

In testimony whereof, we have signed our names to this specification.

CLAUS SPRECKELS.
HOWARD I. MORRIS.